(12) United States Patent
Liang (10) Patent No.: US 11,237,674 B2
(45) Date of Patent: Feb. 1, 2022

(54) METHOD, APPARATUS AND SYSTEM FOR PRESSURE DETECTION, TOUCH-CONTROL CHIP AND ELECTRONIC DEVICE

(71) Applicant: SHENZHEN GOODIX TECHNOLOGY CO., LTD., Shenzhen (CN)

(72) Inventor: Qiquan Liang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/112,622

(22) Filed: Dec. 4, 2020

(65) Prior Publication Data

US 2021/0157444 A1 May 27, 2021

Related U.S. Application Data

(63) Continuation of application No. PCT/CN2019/120413, filed on Nov. 22, 2019.

(51) Int. Cl.
*G06F 3/03* (2006.01)
*G06F 3/044* (2006.01)
*G06F 3/041* (2006.01)

(52) U.S. Cl.
CPC .......... *G06F 3/0442* (2019.05); *G06F 3/0418* (2013.01); *G06F 2203/04105* (2013.01)

(58) Field of Classification Search
CPC ........ G06F 3/03; G06F 3/03545; G06F 3/017; G06F 3/041; G06F 1/1652; G06F 3/011; G06F 3/0383; G06F 3/0446; G06F 3/0346; G06F 3/0442; G06F 3/046
See application file for complete search history.

(56) References Cited

U.S. PATENT DOCUMENTS

| 2003/0214490 | A1 | 11/2003 | Cool | |
|---|---|---|---|---|
| 2014/0354555 | A1* | 12/2014 | Shahparnia | G06F 3/0442 345/173 |
| 2015/0002415 | A1* | 1/2015 | Lee | G06F 3/044 345/173 |

(Continued)

FOREIGN PATENT DOCUMENTS

| CN | 101458581 A | 6/2009 |
|---|---|---|
| CN | 106293175 A | 1/2017 |

(Continued)

*Primary Examiner* — Olga V Merkoulova (57) ABSTRACT

A method for pressure detection is provided, which can avoid a delayed display of a writing pressure generated by the active pen on the screen. The active pen includes a first electrode, a second electrode and a pressure sensor, where the first electrode is configured to output a first driving signal, the second electrode is configured to output a second driving signal when the pressure sensor detects a first pressure generated by the active pen. The method includes: when information of the first pressure is not received, determining whether the active pen is pressing the screen according to the second detecting signal; if it is determined that the active pen is pressing the screen, displaying handwriting of the active pen on the screen according to a second pressure, where the second pressure is a preset pressure.

18 Claims, 5 Drawing Sheets

(56) References Cited

U.S. PATENT DOCUMENTS

| | | | |
|---|---|---|---|
| 2016/0062490 A1* | 3/2016 | Ogata | G06F 3/03545 |
| | | | 345/179 |
| 2016/0077611 A1* | 3/2016 | Katsurahira | G06F 3/04182 |
| | | | 345/179 |
| 2016/0154486 A1* | 6/2016 | Ogata | G06F 3/0383 |
| | | | 345/179 |
| 2016/0274728 A1* | 9/2016 | Luo | G06F 3/0412 |
| 2017/0242502 A1* | 8/2017 | Gray | G06F 3/0416 |
| 2017/0255325 A1 | 9/2017 | Xiao | |
| 2017/0322665 A1* | 11/2017 | Shim | G06F 3/0425 |
| 2018/0173329 A1* | 6/2018 | Chen | G06F 3/03545 |
| 2019/0113986 A1* | 4/2019 | Bikumala | G06F 3/017 |
| 2019/0324562 A1 | 10/2019 | Yin et al. | |
| 2020/0387244 A1* | 12/2020 | Gray | G06F 3/03545 |

FOREIGN PATENT DOCUMENTS

| | | |
|---|---|---|
| GN | 106293220 A | 1/2017 |
| WO | 2019134141 A1 | 7/2019 |

\* cited by examiner

METHOD, APPARATUS AND SYSTEM FOR PRESSURE DETECTION, TOUCH-CONTROL CHIP AND ELECTRONIC DEVICE

CROSS-REFERENCE TO RELATED APPLICATIONS

This application is a continuation of International Application No. PCT/CN2019/120413, filed on Nov. 22, 2019, the disclosure of which is hereby incorporated by reference in its entirety.

TECHNICAL FIELD

Embodiments of the present application relate to the field of information technology, and more specifically, to a method, an apparatus and a system for pressure detection, a touch control chip and an electronic device.

BACKGROUND

At present, as a major peripheral input fitting of an electronic device, an active pen is gradually receiving attention from market. A tip of the active pen can transmit signals. There are a certain quantity of horizontal detecting electrodes and vertical detecting electrodes distributing on a touch plane. Therefore, a signal transmitted by the tip can be detected by the detecting electrodes, and a two dimensional coordinates of the tip on the touch plane can be calculated based on the detecting signal.

Usually a pressure sensor may also be disposed in the active pen, configured to detect a pressure generated by the active pen, thereby adjusting the handwriting of the active pen on the screen according to the pressure. The pressure detected by the pressure sensor is transmitted to the screen by wireless communication. However, the wireless communication may generate a transmission delay, so that the pressure generated by the active pen may not be received by the screen in time, thereby leading to a delayed display of the handwriting on the screen and affect user experience.

SUMMARY

A method, an apparatus and a system for pressure detection, a touch control chip and an electronic device are provided in the present application, which can avoid a delayed display of a writing pressure generated by an active pen on a screen.

In a first aspect, a pressure detection method is provided, the method is configured to detect a pressure generated by an active pen on a screen of an electronic device; the active pen including: a first electrode, a second electrode and a pressure sensor, where the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position; the method including: when information of the first pressure is not received, determining whether the active pen is pressing the screen according to the second detecting signal; if it is determined that the active pen is pressing the screen, displaying handwriting of the active pen on the screen according to a second pressure, where the second pressure is a preset pressure.

In a possible implementation manner, the determining whether the active pen is pressing the screen according to the second detecting signal, including: if an amplitude of the second detecting signal is greater than a threshold, it is determined that the active pen is pressing the screen; and/or, if the amplitude of the second detecting signal is less than the threshold, it is determined that the active pen is not pressing the screen.

In a possible implementation manner, the method further includes: when the information of the first pressure is received, displaying the handwriting of the active pen on the screen according to the first pressure.

In a possible implementation manner, the second pressure changes from low to high gradually.

In a possible implementation manner, the second pressure is a preset constant value.

In a possible implementation manner, the first electrode is configured to output the first driving signal according to a first time sequence, and the second electrode is configured to output the second driving signal according to a second time sequence, where the first time sequence is different from the second time sequence.

In a possible implementation manner, a frequency of the first driving signal is a first frequency, a frequency of the second driving signal is a second frequency, where the first frequency is different from the second frequency.

In a possible implementation manner, the first detecting signal is obtained by a touch control chip based on the first driving signal, and the second detecting signal is obtained by the touch control chip based on the second driving signal.

In a possible implementation manner, the active pen further includes a wireless communication module, and the wireless communication module is configured to send the information of the first pressure through bluetooth communication or wireless-fidelity (WIFI) communication.

In a possible implementation manner, the pressure generated by the active pen is related to thickness of the handwriting of the active pen displayed on the screen.

In a second aspect, an apparatus for pressure detection is provided, where the apparatus is configured to detect a pressure generated by an active pen on a screen of an electronic device; the active pen including: a first electrode, a second electrode and a pressure sensor, where the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position; the apparatus including: a processing module, configured to determine whether the active pen is pressing the screen according to the second detecting signal, when information of the first pressure is not received; a control module, configured to display the handwriting of the active pen on the screen according to a second pressure, when the processing module determines that the active pen is pressing the screen, where the second pressure is a preset pressure.

In a possible implementation manner, the processing module is configured to: if an amplitude of the second detecting signal is greater than a threshold, it is determined that the active pen is pressing the screen; and/or, if the amplitude of the second detecting signal is less than the threshold, it is determined that the active pen is not pressing the screen.

In a possible implementation manner, the control module is further configured to: when the information of the first pressure is received, displaying the handwriting of the active pen through the screen according to the first pressure.

In a possible implementation manner, the second pressure changes from low to high gradually.

In a possible implementation manner, the second pressure is a preset constant value.

In a possible implementation manner, the first electrode is configured to output the first driving signal according to a first time sequence, and the second electrode is configured to output the second driving signal according to a second time sequence, where the first time sequence is different from the second time sequence.

In a possible implementation manner, a frequency of the first driving signal is a first frequency, a frequency of the second driving signal is a second frequency, where the first frequency is different from the second frequency.

In a possible implementation manner, the first detecting signal is obtained by a touch control chip based on the first driving signal, and the second detecting signal is obtained by the touch control chip based on the second driving signal.

In a possible implementation manner, the active pen further includes a wireless communication module, and the wireless communication module is configured to send the information of the first pressure through bluetooth communication or WIFI communication.

In a possible implementation manner, the pressure generated by the active pen is related to thickness of the handwriting of the active pen displayed on the screen.

In a third aspect, an electronic device is provided, including the pressure detection apparatus according to the forgoing second aspect and any possible implementation manners of the second aspect; and, a screen.

In a fourth aspect, a pressure detection system is provided, including the electronic device according to the forgoing third aspect and any possible implementation manners of the third aspect; and an active pen.

In a fifth aspect, a computer readable medium is provided for storing computer programs, and the computer programs include instructions for executing the method in the forgoing first aspect or any possible implementation manners of the first aspect.

In a sixth aspect, a touch control chip is provided, including the apparatus for pressure detection in the forgoing second aspect and any possible implementation manners of the second aspect.

Based on the forgoing technical solutions, since the second electrode for calibrating a position in the active pen can output the second driving signal when the active pen is generating a pressure, it can be determined whether the active pen is generating the pressure based on the detecting signal corresponding to the second driving signal, and when determining the active pen generates the pressure, the screen can display the handwriting of the active pen according to the preset pressure. In this way, it can be acknowledged that the active pen generates a pressure when the actual pressure sent by the active pen is not received, so that the handwriting of the active pen can be displayed according to the preset pressure which avoiding the delayed display of writing pressure of the active pen on the screen and improving user experience.

DESCRIPTION OF EMBODIMENTS

Technical solutions of the present application is hereinafter described with reference to the accompanying drawings.

Figure 1:
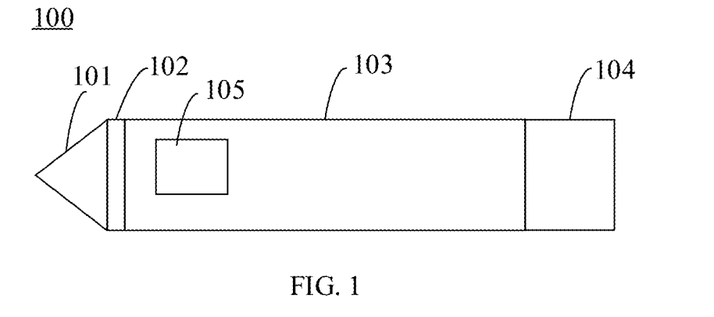
FIG. 1 is a schematic diagram of an active pen.
Figure 2:
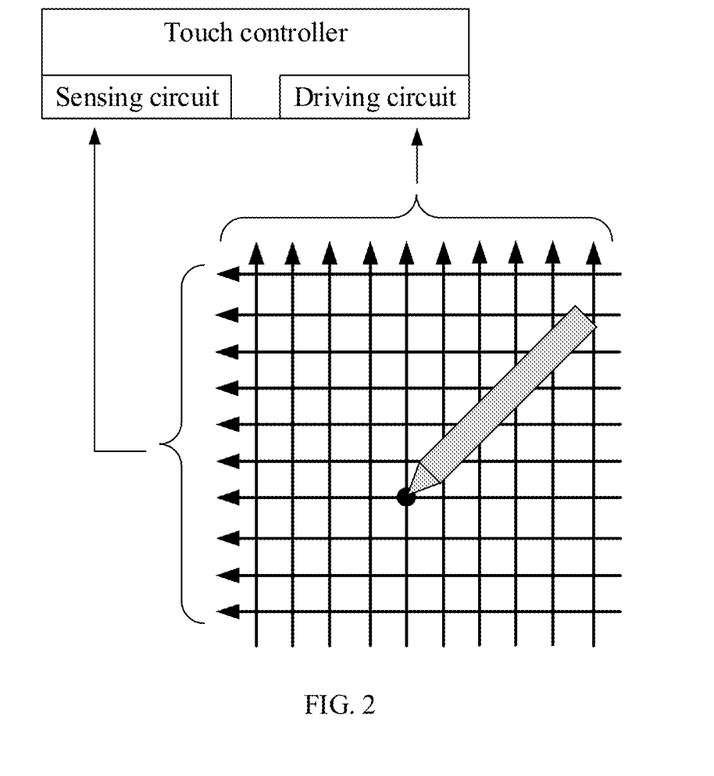
FIG. 2 is a schematic diagram of an active pen touching a screen.

FIG. 1 is a schematic diagram of a common active pen 100 at present. The active pen 100 includes a first electrode 101, a second electrode 102, a pen body 103 and a wireless communication module 104. The first electrode 101 is configured to output a first driving signal, and the first driving signal is used to calculate a position of the active pen 100 on a screen. For example, as shown in FIG. 2, there are a certain quantity of horizontal detecting electrodes and vertical detecting electrodes distributing on the screen, and if the first driving signal output by the first electrode 101 acting at a position on the screen, then the horizontal electrode and the vertical electrode corresponding to the position would generate a corresponding detecting signal, thereby calculating a two dimensional coordinates of the active pen 100 on the screen according to the detecting signal. However, when people write, the active pen 100 tends to incline, which leads to a deviation between the position coordinate calculated based on the detecting signal and the actual position of the tip of the pen. The position coordinate can be calibrated by the second driving signal output by the second electrode 102. In this way, with two electrodes outputs driving signals simultaneously, and the inclination angle and azimuth angle of the pen body relative to the touch plane can be calculated based on their relative positions.

The first electrode 101 is also connected to a pressure sensor 105. The pressure sensor 105 is configured to detect the pressure generated by the active pen 100 on the screen, which enables the active pen 100 to sense changes in the user's writing strength, and the screen can change the thickness of the handwriting according to the changes of writing strength, so as to achieve a superior user experience. Information of the pressure output by the active pen 100 may be sent to the electronic device through the wireless communication module 104 in the active pen 100, and the electronic device may adjust the handwriting of the active pen 100 on the screen according to the pressure.

It should be understood that the pressure generated by the active pen described in an embodiment of the present application is a pressure output by the user through the active pen, i.e., the user's writing pressure. The user may apply pressure to the screen by the active pen, and different handwriting of the active pen may be displayed on the screen depending on different pressure. The pressure is detected by the pressure sensor in the active pen. The second electrode 102 will usually start to output the second driving signal only after the pressure sensor 105 detecting the pressure generated by the active pen.

At the same time, information of the pressure can be sent to the wireless communication module 104 when the pressure sensor 105 detects the pressure generated by the active pen 100. However, wireless communication usually generates a transmission delay, and when the active pen 100 apply a pressure on the screen, the information of the pressure may be obtained by the screen after a certain delay. Since the information of the pressure cannot be received in time, there will be a delay displaying the writing pressure on the screen, thereby affecting the user experience.

Therefore, a pressure detection method is provided in an embodiment of the present application, which can avoid delayed display of the writing pressure generated by the active pen on the screen.

Figure 3:
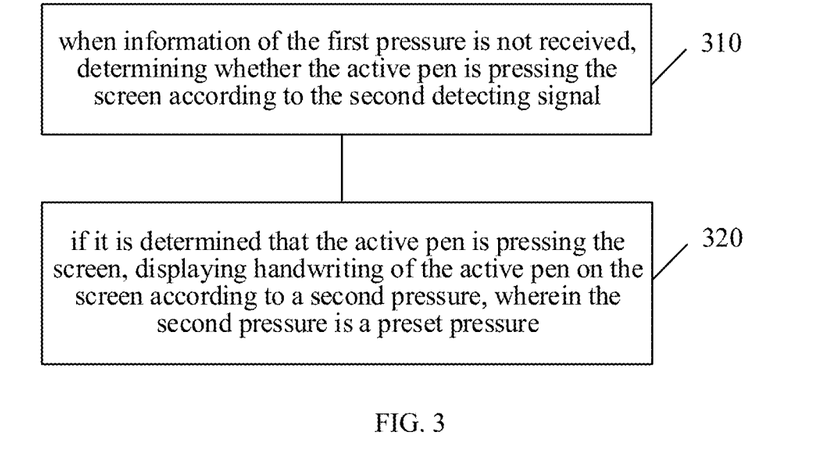
FIG. 3 is a schematic flowchart of a pressure detection method according to an embodiment of the present application.

FIG. 3 is a schematic flowchart of a pressure detection method according to an embodiment of the present application. The method is configured to detect a pressure generated by the active pen on the screen of an electronic device.

The active pen includes a first electrode, a second electrode and a pressure sensor. The first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position of the active pen.

The driving signal is also called driving signal, a detecting electrode in a screen can output a corresponding detecting signal when each driving signal is transmitted to the screen, then the position of the active pen can be determined according to the detecting signal corresponding to the driving signal. The detecting signal may also be called sensing signal.

The method according to an embodiment of the present application can by generated by the pressure detection apparatus. The pressure detection apparatus may be a touch controller such as a touch control chip, or a processor of an electronic device, which is not limited by the embodiments of the present application. Wireless connection can be established between the active pen and the electronic device, such as WIFI connection or bluetooth connection. The electronic device may receive information or data sent by the active pen through wireless connection and transmit it to the processor or the touch controller, so as to determine the information of the pressure of the active pen or the position coordinate, etc. These information can eventually be indicated to a display layer of the screen, so that the screen displays the corresponding handwriting.

As shown in FIG. 3, the method 300 includes part or all of the following steps.

In 310, when the information of the first pressure is not received, it is determined whether the active pen is pressing the screen based on the second detection signal.

In 320, if it is determined that the active pen is pressing the screen, the handwriting of the active pen is displayed by the screen based on the second pressure.

The first pressure is the pressure actually applied by the active pen to the screen, i.e., the actual pressure, while the second pressure is a preset pressure, or a simulated pressure.

After the pressure sensor in the active pen detects the first pressure generated by the active pen, the active pen may send the information of the first pressure to the electronic device through the wireless communication module, and after the electronic device receiving the information of the first pressure, the electronic device would notify the information of the first pressure to the display layer of the screen, thereby the handwriting matching the first pressure is displayed. However, due to a certain time delay in the wireless communication, the moment when the display layer of the screen obtains the information of the first pressure sent by the active pen is usually later than the moment when the active pen actually generates the first pressure.

Since the second electrode in the active pen outputs a second driving signal when the active pen generates the pressure, in the embodiment, it can be determined that whether there is pressure output by the active pen based on the second detection signal corresponding to the second driving signal when the information of the first pressure is obtained. When it is determined that the active pen outputs a pressure, the screen displays the handwriting of the active pen according to the second pressure, which avoids the delayed display of the writing pressure of the active pen on the screen and improves the user experience.

When an active pen outputs the first driving signal, the touch control chip can detect the first detecting signal generated based on the first driving signal. Likewise, when the capacitive pen outputs the second driving signal, the touch control signal can detect the second detecting signal generated based on the second driving signal.

Optionally, in 320, if an amplitude of the second detecting signal is greater than a threshold, it can be determined that the active pen is pressing the screen; and/or, if the amplitude of the second detecting signal is less than the threshold, it can be determined that the active pen is not pressing the screen.

After step 320, when the information of the first pressure is received, the handwriting of the active pen may be displayed on the screen according to the first pressure.

When the active pen generates the first pressure, the pressure sensor can detect the first pressure. On one hand, the second electrode of the active pen will output the second driving signal immediately; on the other hand, the active pen will send the information of the first pressure through wireless communication. It can be seen that due to the delay of wireless communication, the moment when the first pressure sent by the active pen is received is later than the moment when the second electrode outputs the second driving signal. So when the information of the first pressure sent by the active pen is not received, if it is determined that the active pen has generated a pressure according to the second detecting signal corresponding to the second driving signal output by the second electrode, the screen can display the handwriting of the active pen according to the second pressure first. After that, when the information of the first pressure is received, the handwriting of the active pen can be displayed on the screen according to the first pressure.

The pressure generated by the active pen relates to thickness of the handwriting of the active pen displayed on the screen. For example, the pressure generated by the active pen is related to the thickness of the handwriting of the active pen. For example, a large pressure displays thick handwriting on the screen, and a small pressure presents thin handwriting on the screen. For another example, the pressure generated by the active pen may also relate to characteristics of the active pen, such as color of the handwriting, shape of the nip, etc.

Figure 4:
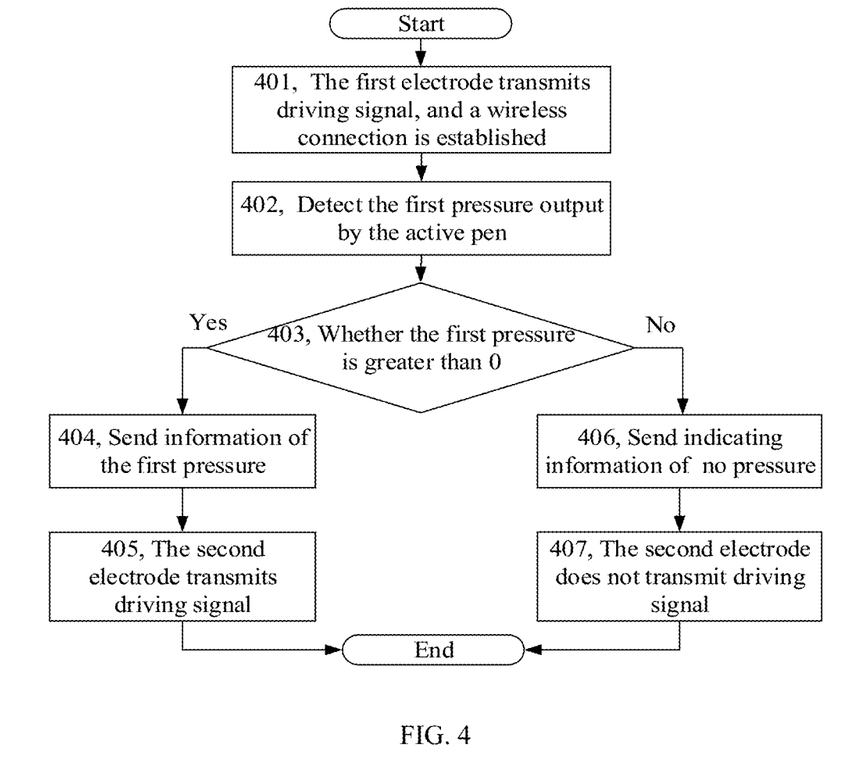
FIG. 4 is schematic diagram of work flow of an active pen.

In the embodiments of the present application, the first electrode may also be called tip electrode and the second electrode may be called ring electrode. The second electrode starts to output a driving signal when the pressure sensor detects the pressure generated by the active pen. For example, the work flow of the active pen as shown in FIG. 4.

In 401, the first electrode outputs the driving signal and establish wireless connection with the electronic device.

In 402, the pressure sensor detects the first pressure generated by the active pen.

In 403, it is determined whether the first pressure is greater than the threshold, for example, 0.

If the first pressure is greater than 0, then 404 and 405 are executed; if the first pressure is less than 0, then 406 and 407 are executed.

In 404, the active pen sends the information of the first pressure to the electronic device.

For example, the active pen can send the information of the first pressure through WIFI or bluetooth.

In 405, the second electrode outputs the driving signal.

In 406, the active pen sends an indicating information of no pressure to the electronic device so as to indicate that the active pen does not generate a pressure.

In 407, the second electrode does not output the driving signal.

Figure 5:
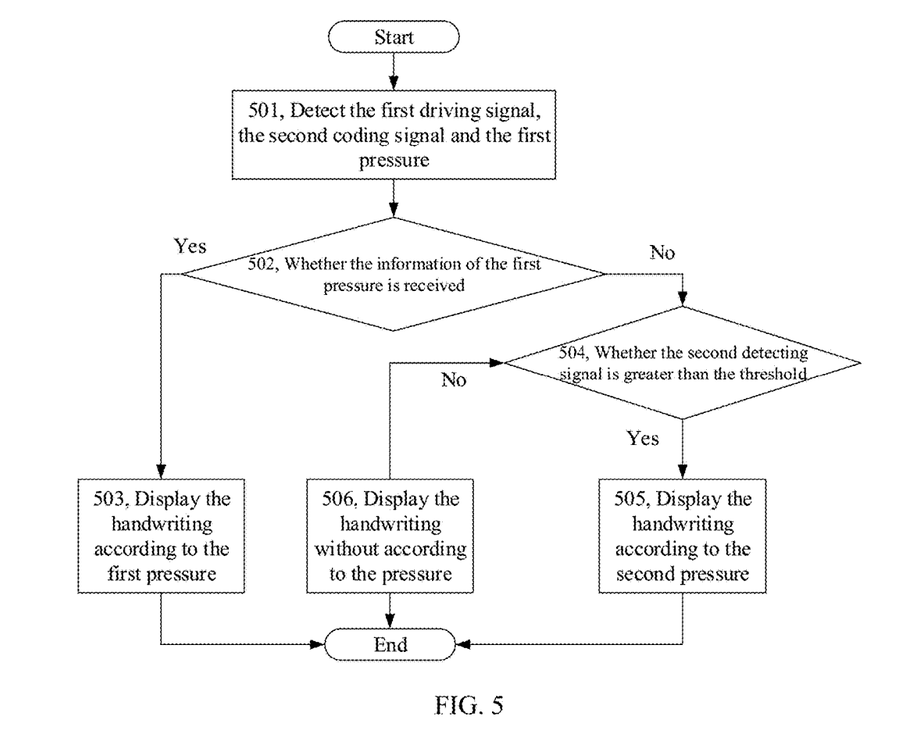
FIG. 5 is a schematic diagram of work flow of a pressure detection apparatus according to an embodiment of the present application.

FIG. 5 is a schematic diagram of work flow of a pressure detection apparatus according to an embodiment of the present application. FIGS. 4-5 both show an operation in one cycle, and an executing body of steps in FIGS. 4-5 are not limited hereto.

In 501, the first driving signal output by the first electrode and the second driving signal output by the second electrode are detected, and the information of the first pressure sent by the active pen are detected.

For example, the touch control chip can detect the first driving signal and the second driving signal, and obtain the corresponding first detecting signal and the corresponding second detecting signal; the electronic device can detect the information of the first pressure through WIFI or bluetooth communication. For example, the information of the pressure can be detected by a WIFI chip or a bluetooth chip of the electronic device, and necessarily the detected information of the pressure can be transmitted to other modules or chips in the electronic device through interfaces.

In 502, it is judged whether the information of the first pressure is received.

If the information of that first pressure is received, then 503 is executed; if a message of that first pressure is not received, then 504 is executed.

In 503, the handwriting of the active pen is displayed through the screen according to the first pressure.

In 504, it is determined whether the second detection signal corresponding to the second driving signal is greater than the threshold.

If the second detection signal is greater than the threshold, then 505 is executed; if the second detection signal is less than the threshold, then 506 is executed.

In 505, the handwriting of the active pen is displayed through the screen according to the second pressure.

In 506, the screen displays the handwriting of the active pen without according to the pressure.

It should be understood that the threshold can be 0. If the second detection signal is greater than 0, it is indicated that the second electrode outputs a second driving signal, and the active pen is considered to generate a pressure on the screen; otherwise, it is considered that the active pen does not generate a pressure. However, considering the effect of noise of the screen on the second detecting signal, the threshold can be set to be greater than 0. At this time, the active pen is considered to generate a pressure on the screen only when the second detection signal is greater than the threshold; and when the second detecting signal is less than the threshold, it may be caused by the noise rather than the second driving signal, and the active pen may be considered not to generate a pressure.

Figure 6:
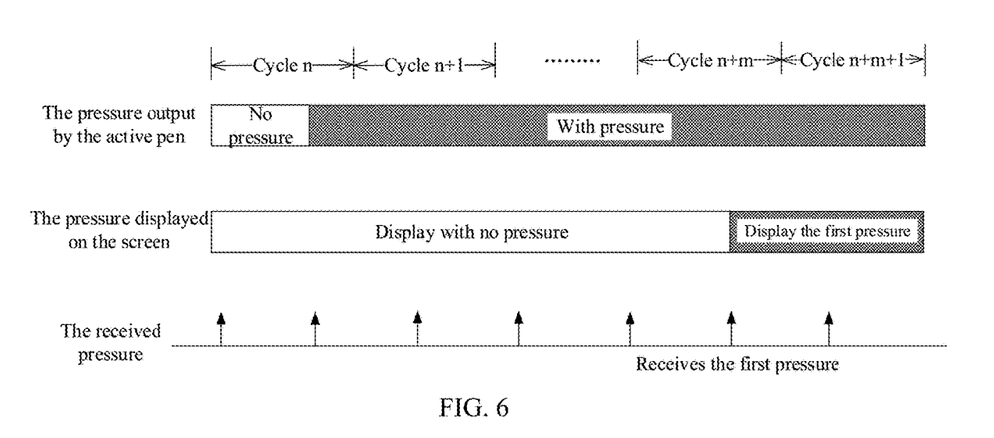
FIG. 6 is a schematic diagram of time when a screen displays handwriting of an active pen adopting the method according to an embodiment of the present application.

In order to illustrate more clearly how the delayed display of the writing pressure of the active pen on the screen can be avoided by using the forgoing method, the process of displaying the handwriting of the active pen on the screen is described below in FIGS. 6-7. FIG. 6 is a schematic diagram of time when a screen displaying the handwriting of an active pen without adopting the method according to an embodiment of the present application, and FIG. 7 is a schematic diagram of time when a screen displays the handwriting of an active pen adopting the method according to an embodiment of the present application.

As shown in FIG. 6, the active pen generates the first pressure on the screen during the n-th cycle. Due to the time delay of the wireless communication, the screen obtains the information of the first pressure in the (n+m)-th cycle and display the corresponding handwriting according to the first pressure.

Figure 7:
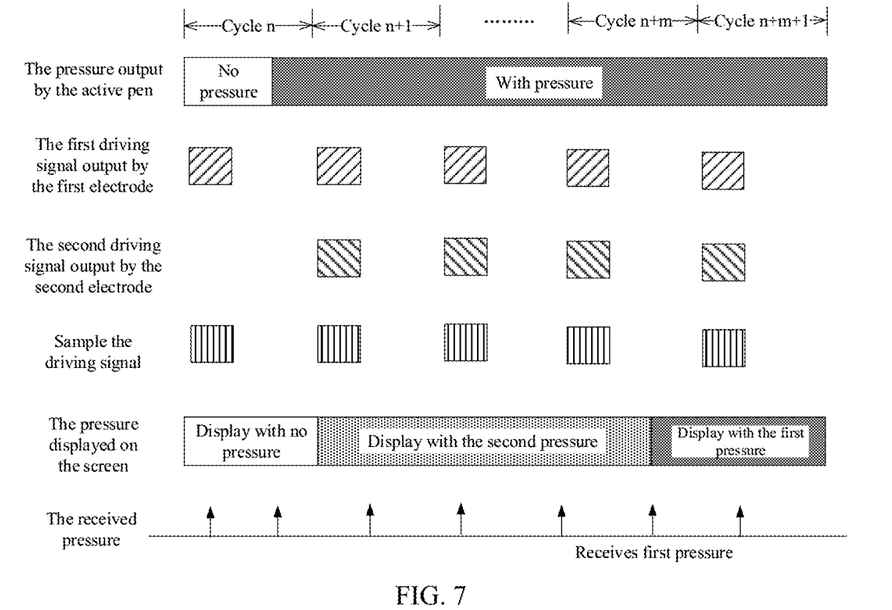
FIG. 7 is a schematic diagram of time when a screen displays handwriting of an active pen adopting the method according to an embodiment of the present application.

However, in FIG. 7, the active pen generates a first pressure on the screen in the n-th cycle, the pressure sensor of the active pen detects the first pressure in the (n+1)-th cycle, and the second electrode of the active pen begins to output the second driving signal when the pressure sensor detects the first pressure. Since when the second electrode outputs the second driving signal in the (n+1)-th cycle, it can be obtained the corresponding second detection signal according to the second driving signal, so it can be known that the active pen generate a pressure in the (n+1)-th cycle, then the screen can displays the handwriting of the active pen in the (n+1)-th cycle according to the second pressure. Subsequently, when the electronic device receives the information of the first pressure sent by the active pen in the (n+m)-th cycle, the handwriting of the active pen can be displayed in the (n+m)-th cycle according to the first pressure. As can be seen, in FIG. 6, the screen displays the handwriting of active pen from the (n+m)-th cycle, which generates a display delay from the (n+1)-th cycle to the (n+m)-th cycle, thereby affecting the user experience. In FIG. 7, the screen first displays the handwriting of the active pen according to the preset pressure, i.e., the second pressure, starting from the (n+1)-th cycle, and then displays the handwriting of the active pen according to the first pressure, starting from the (n+m)-th cycle receiving the actual pressure, i.e., the first pressure. This reduces the delayed display of the handwriting pressure of the active pen to the screen, which greatly improves the user experience.

The second pressure may be a preset constant value.

Or, considering the writing strength changes from light to heavy when the active pen starts to write, that is, the pressure is little when the tip start to touch the screen, and then the pressure gradually increases. Therefore, the second pressure may also change from low to high gradually.

The first electrode continuously outputs the first driving signal, and the first electrode needs to output the first driving signal continuously according to a certain time sequence. For example, in FIGS. 8-9, the first electrode transmits driving signal according to the first time sequence, i.e., according to time. The shaded areas shown in the second row of FIGS. 8-9 indicate the time at which the first electrode outputs the first driving signal.

The second electrode outputs the second driving signal when the active pen generates the pressure, and similarly, the second electrode outputs the second driving signal according to a certain time sequence, i.e., drives according to time. The shaded areas shown in the third row of FIGS. 8-9 indicate the time at which the second electrode outputs the second driving signal.

Figure 8:
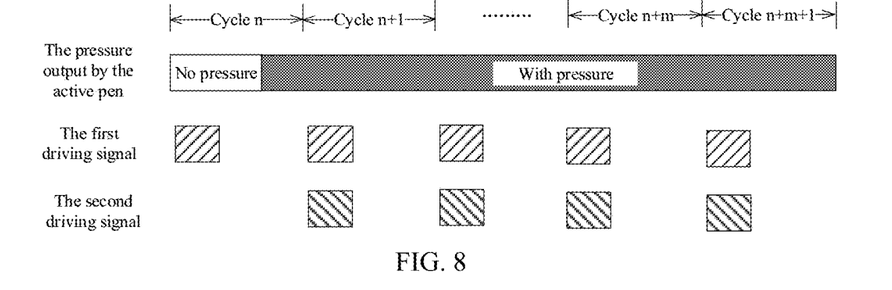
FIG. 8 is a schematic diagram of same driving time sequence of a first electrode and a second electrode.
Figure 9:
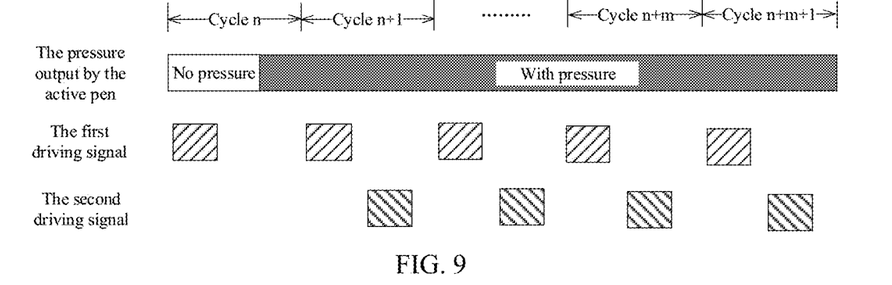
FIG. 9 is a schematic diagram of different driving time sequence of a first electrode and a second electrode.

In FIG. 8, the first time sequence and the second time sequence are the same, i.e., the first electrode and the second electrode output the driving signals at the same time. In FIG. 9, however, the first time sequence and the second time sequence are different, i.e., the time sequence of the first electrode and second electrode outputs the driving signal is different or does not completely overlap.

The frequency of the first driving signal is the first frequency, and the frequency of the second driving signal is the second frequency. The first driving signal and the second driving signal may be, for example, a rectangular wave or a sine wave, which have respective signal frequencies. For the case where the first time sequence and the second time sequence shown in FIG. 8 are the same, the signal frequencies of the first driving signal and the second driving signal need to be different, i.e., the first frequency and the second frequency are different, and otherwise they will interfere with each other. For the case where the first time sequence and the second time sequence are not the same as shown in FIG. 9, the first frequency and the second frequency can be either the same or different.

If the first frequency and the second frequency are different, the touch controller needs to have the ability to decode the dual frequency signal.

The first time sequence may be periodic, i.e., the first electrode transmits driving signal periodically according to time; or, the first timing may be non-periodic. Similarly, the second time sequence may be periodic, i.e., the second electrode transmits driving signal periodically according to time; or, the second timing may be non-periodic. The first time sequence and second time sequence shown in FIGS. 6-9 are merely examples, and are not limited by the embodiments of the present application.

Figure 10:
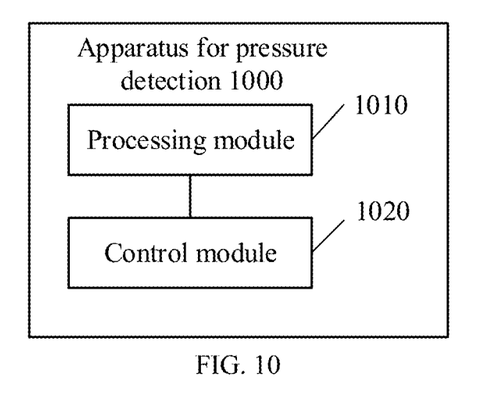
FIG. 10 is a schematic block diagram of a pressure detection apparatus according to an embodiment of the present application; and, FIG. 11 is a schematic structural diagram of a pressure detection device according to an embodiment of the present application.

FIG. 10 is a schematic block diagram of a pressure detection apparatus according to an embodiment of the present application. The apparatus 1000 device is configured to detect a pressure generated by an active pen on a screen of an electronic device; the active pen including: a first electrode, a second electrode and a pressure sensor, where the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position.

As shown in FIG. 10, the apparatus 1000 includes:

a processing module 1010, configured to determine whether the active pen is pressing the screen according to the second detecting signal, when information of the first pressure is not received; and a control module 1020, configured to display handwriting of the active pen on the screen according to a second pressure, when the processing module 1010 determines that the active pen is pressing the screen, where the second pressure is a preset pressure.

Since the second electrode for calibrating a position in the active pen can output the second driving signal when the active pen is generating a pressure, it can be determined whether the active pen is generating the pressure based on the detecting signal corresponding to the second driving signal, and when determining the active pen generates the pressure, the screen can display the handwriting of the active pen according to the preset pressure. In this way, it can be acknowledged that the active pen has generated a pressure when the actual pressure sent by the active pen is not received, so that the handwriting of the active pen can be displayed according to the preset pressure which avoiding the delayed display of writing pressure of the active pen on the screen and improving user experience.

Optionally, the processing module 1010 is configured to: if the amplitude of the second detecting signal is greater than the threshold, it is determined that the active pen is pressing the screen; and/or, if the amplitude of the second detecting signal is less than the threshold, it is determined that the active pen is not pressing the screen.

Optionally, the control module 1020 is further configured to: when the information of the first pressure is received, displaying the handwriting of the active pen through the screen according to the first pressure.

Optionally, the second pressure changes from low to high gradually.

Optionally, the second pressure is a preset constant value.

Optionally, the first electrode is configured to output the first driving signal according to a first time sequence, the second electrode is configured to output the second driving signal according to a second time sequence, where the first time sequence is different from the second time sequence.

Optionally, a frequency of the first driving signal is a first frequency, a frequency of the second driving signal is a second frequency, where the first frequency is different from the second frequency.

Optionally, the first detecting signal is obtained by a touch control chip based on the first driving signal, and the second detecting signal is obtained by the touch control chip based on the second driving signal.

Optionally, the active pen further includes a wireless communication module, where the wireless communication module is configured to send the information of the first pressure through bluetooth communication or WIFI communication.

It should be understood that the forgoing and other operations and/or functions of various module in the apparatus 1000 shown in FIG. 10 are configured to implement the corresponding procedures of the method for detecting pressure in FIG. 3, and are not further described herein for brevity.

The apparatus 1000 may be a touch controller, or a processor of the electronic device.

Figure 11:
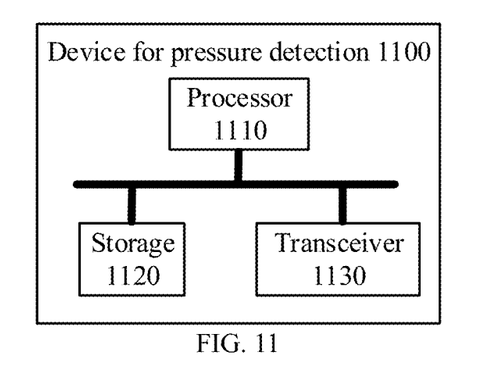

FIG. 11 is a schematic structural diagram of a pressure detection device 1100 according to an embodiment of the present application. As shown in FIG. 11, the detection device 1100 includes a processor 1110, a storage 1120 and a transceiver 1130.

The storage 1120 is configured to store programs. Specifically, the programs may include program codes, where the program codes include computer operation instructions. Optionally, the storage 1120 can store and execute the forgoing programs of the method for pressure detection in the embodiments of the present application.

The processor 1110 may call a computer program from the memory 1120 and run it to implement the method in the embodiments of the present application. The processor 1110 may control the communication among the transceiver 1130 and other devices, specifically, send information or data to other devices, or receive information or data sent by other devices. Optionally, the processor 1110 executes the programs stored in the storage 1120, thereby executing the forgoing method for pressure detection in the embodiments of the present application.

The transceiver 1130 may include an input interface and an output interface. Specifically, the processor 1110 may control the communication among the input interface and other devices, so as to obtain information or data sent by other devices, or output information or data to the other devices.

The processor 1110 may be an integrated circuit chip with signal processing capability. In an implementation process, steps of the foregoing method embodiments may be completed by using an integrated logical circuit of hardware in the processor or an instruction in a form of software. The foregoing processor may be a general purpose processor, such as a central processing unit (CPU), a network processor (NP) etc., a digital signal processor (DSP), an application specific integrated circuit (ASIC), a field programmable gate array (FPGA) or another programmable logic device, a discrete gate or a transistor logic device, or a discrete hardware component. The methods, the steps, and the logical block diagrams disclosed in the embodiments of the present application can be implemented or executed. The general-purpose processor may be a microprocessor or the processor may be any conventional processor or the like. Steps of the methods disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is disposed in the memory 1120, and the processor 1110 reads information in the memory 1120 and completes the steps of the foregoing method in combination with hardware thereof.

The memory 1120 may be a volatile memory or a non-volatile memory, or include both volatile memory and non-volatile memory. The non-volatile memory may be a read-only memory (ROM), a programmable ROM (PROM), an erasable PROM (EPROM), or an electrically EPROM (EEPROM) or a flash memory. The volatile memory may be a random access memory (RAM) and used as an external cache. By way of example and not limitation, RAMs of many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

An electronic device is further provided in an embodiment of the present application, where includes the apparatus for pressure detection in forgoing various embodiments of the present application; and a screen.

By way of example but not limitation, the electronic device may be portable or mobile computing devices such as a terminal device, a mobile phone, a tablet computer, a notebook computer, a desktop computer, a gaming device, an in-vehicle electronic device or a wearable smart device, and other electronic devices such as an electronic database, an automobile and an automated teller machine (ATM). The wearable smart device is full-featured and large-sized and can realize complete or partial functions without relying on a smart phone, such as a smart watch or smart glasses, and only focuses on a certain type of application function, and shall be used in cooperation with such other device as a smart phone, such as various types of smart bracelets, smart jewelry and other devices for physical sign monitoring.

A system for pressure detection is further provided in an embodiment of the present application, including the electronic device in foregoing various embodiments of the present application; and an active pen.

It shall be noted that each embodiment described in the present application and/or the technical features in each embodiment can be combined with each other arbitrarily in the case of no conflict, and the technical solutions obtained after combination should also fall into the protection scope of the present application.

It should be understood that the specific examples in the embodiments of the present application are only to help a person skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation manners of the present application. However, the protection scope of the present application is not limited thereto, and a person skilled in the art who is familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A pressure detection method, wherein the method is configured to detect a pressure generated by an active pen on a screen of an electronic device; the active pen comprising: a first electrode, a second electrode and a pressure sensor, wherein the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position; the method comprising:

when information of the first pressure is received, displaying the handwriting of the active pen on the screen according to the first pressure;

when the information of the first pressure is not received, determining whether the active pen is pressing the screen according to the second detecting signal;
if it is determined that the active pen is pressing the screen, displaying handwriting of the active pen on the screen according to a second pressure, wherein the second pressure is a preset pressure.

2. The method according to claim 1, wherein the determining whether the active pen is pressing the screen according to the second detecting signal, comprising:
if an amplitude of the second detecting signal is greater than a threshold, it is determined that the active pen is pressing the screen; and/or,
if the amplitude of the second detecting signal is less than the threshold, it is determined that the active pen is not pressing the screen.

3. The method according to claim 1, wherein the second pressure changes from low to high gradually.

4. The method according to claim 1, wherein the second pressure is a preset constant value.

5. The method according to claim 1, wherein the first electrode is configured to output the first driving signal according to a first time sequence, and the second electrode is configured to output the second driving signal according to a second time sequence, wherein the first time sequence is different from the second time sequence.

6. The method according to claim 1, wherein a frequency of the first driving signal is a first frequency, a frequency of the second driving signal is a second frequency, wherein the first frequency is different from the second frequency.

7. The method according to claim 1, wherein the first detecting signal is obtained by a touch control chip based on the first driving signal, and the second detecting signal is obtained by the touch control chip based on the second driving signal.

8. The method according to claim 1, wherein the active pen further comprises a wireless communication module, and the wireless communication module is configured to send the information of the first pressure through bluetooth communication or wireless-fidelity (WIFI) communication.

9. An apparatus for pressure detection, wherein the apparatus is configured to detect a pressure generated by an active pen on a screen of an electronic device; the active pen comprising: a first electrode, a second electrode and a pressure sensor, wherein the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position; the apparatus comprising:
a processing module, configured to determine whether the active pen is pressing the screen according to the second detecting signal, when information of the first pressure is not received;
a control module, configured to display handwriting of the active pen on the screen according to a second pressure, when the processing module determines that the active pen is pressing the screen, wherein the second pressure is a preset pressure,
wherein the control module is further configured to display the handwriting of the active pen through the screen according to the first pressure when the information of the first pressure is received.

10. The apparatus according to claim 9, wherein the processing module is configured to:
if an amplitude of the second detecting signal is greater than a threshold, it is determined that the active pen is pressing the screen; and/or,
if the amplitude of the second detecting signal is less than the threshold, it is determined that the active pen is not pressing the screen.

11. The apparatus according to claim 9, wherein the second pressure changes from low to high gradually.

12. The apparatus according to claim 9, wherein the second pressure is a preset constant value.

13. The apparatus according to claim 9, wherein the first electrode is configured to output the first driving signal according to a first time sequence, the second electrode is configured to output the second driving signal according to a second time sequence, wherein the first time sequence is different from the second time sequence.

14. The apparatus according to claim 9, wherein a frequency of the first driving signal is a first frequency, a frequency of the second driving signal is a second frequency, wherein the first frequency is different from the second frequency.

15. The apparatus according to claim 9, wherein the first detecting signal is obtained by a touch control chip based on the first driving signal, and the second detecting signal is obtained by the touch control chip based on the second driving signal.

16. The apparatus according to claim 9, wherein the active pen further comprises a wireless communication module, and the wireless communication module is configured to send the information of the first pressure through bluetooth communication or WIFI communication.

17. An electronic device, comprising:
the pressure detection apparatus according to claim 9; and,
a screen.

18. A touch control chip, comprising a pressure detection apparatus, wherein the apparatus is configured to detect a pressure generated by an active pen on a screen of an electronic device; the active pen comprising: a first electrode, a second electrode and a pressure sensor, wherein the first electrode is configured to output a first driving signal, the second electrode is configured to output a second driving signal when the pressure sensor detects a first pressure generated by the active pen, a first detecting signal corresponding to the first driving signal is configured to determine a position of the active pen on the screen, and a second detecting signal corresponding to the second driving signal is configured to calibrate the position; the apparatus comprises:
a processing module, configured to determine whether the active pen is pressing the screen according to the second detecting signal, when information of the first pressure is not received;
a control module, configured to display handwriting of the active pen on the screen according to a second pressure, when the processing module determines that the active pen is pressing the screen, wherein the second pressure is a preset pressure;
wherein the control module is further configured to display the handwriting of the active pen through the screen according to the first pressure when the information of the first pressure is received.

* * * * *